United States Patent Office.

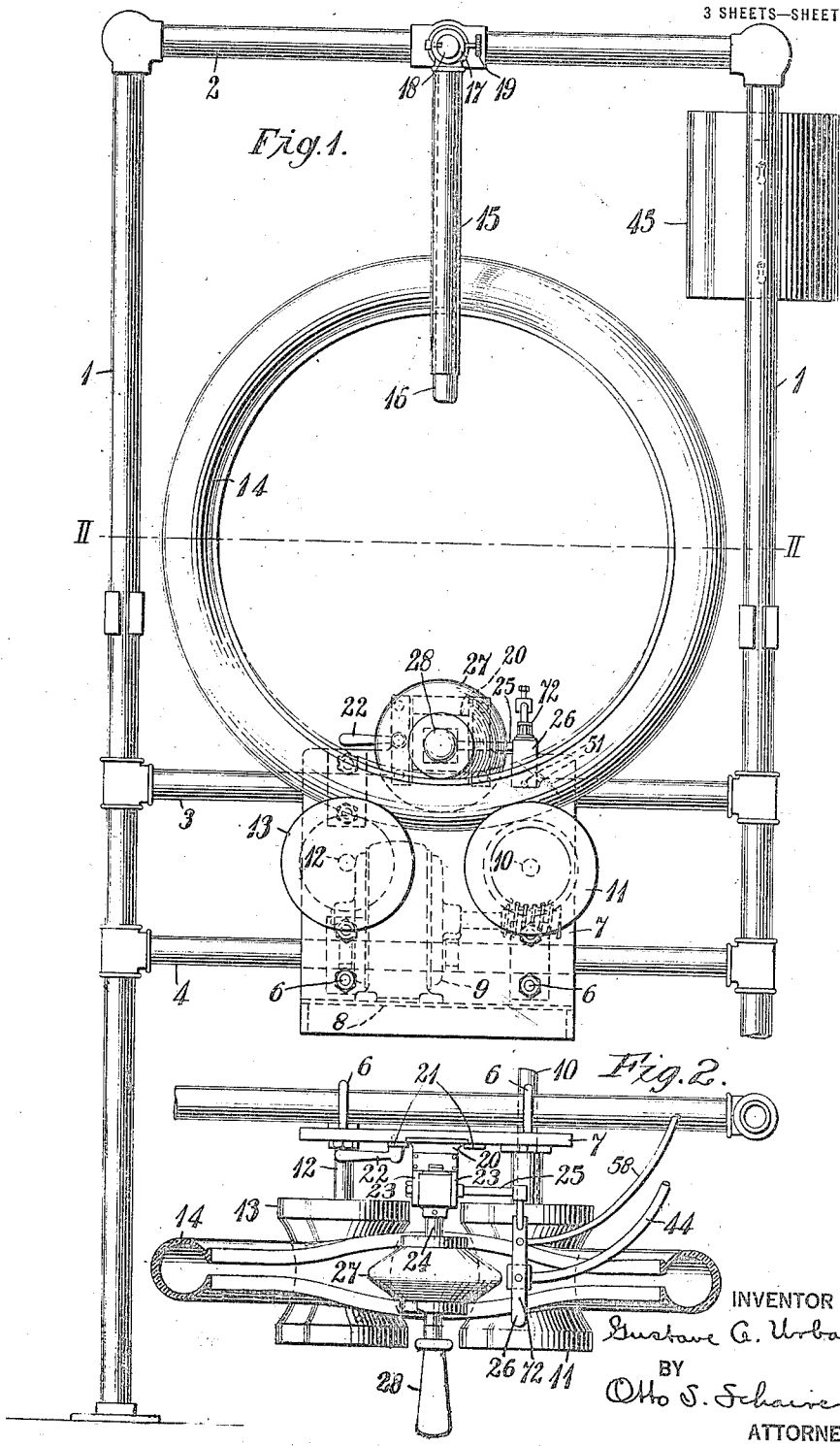

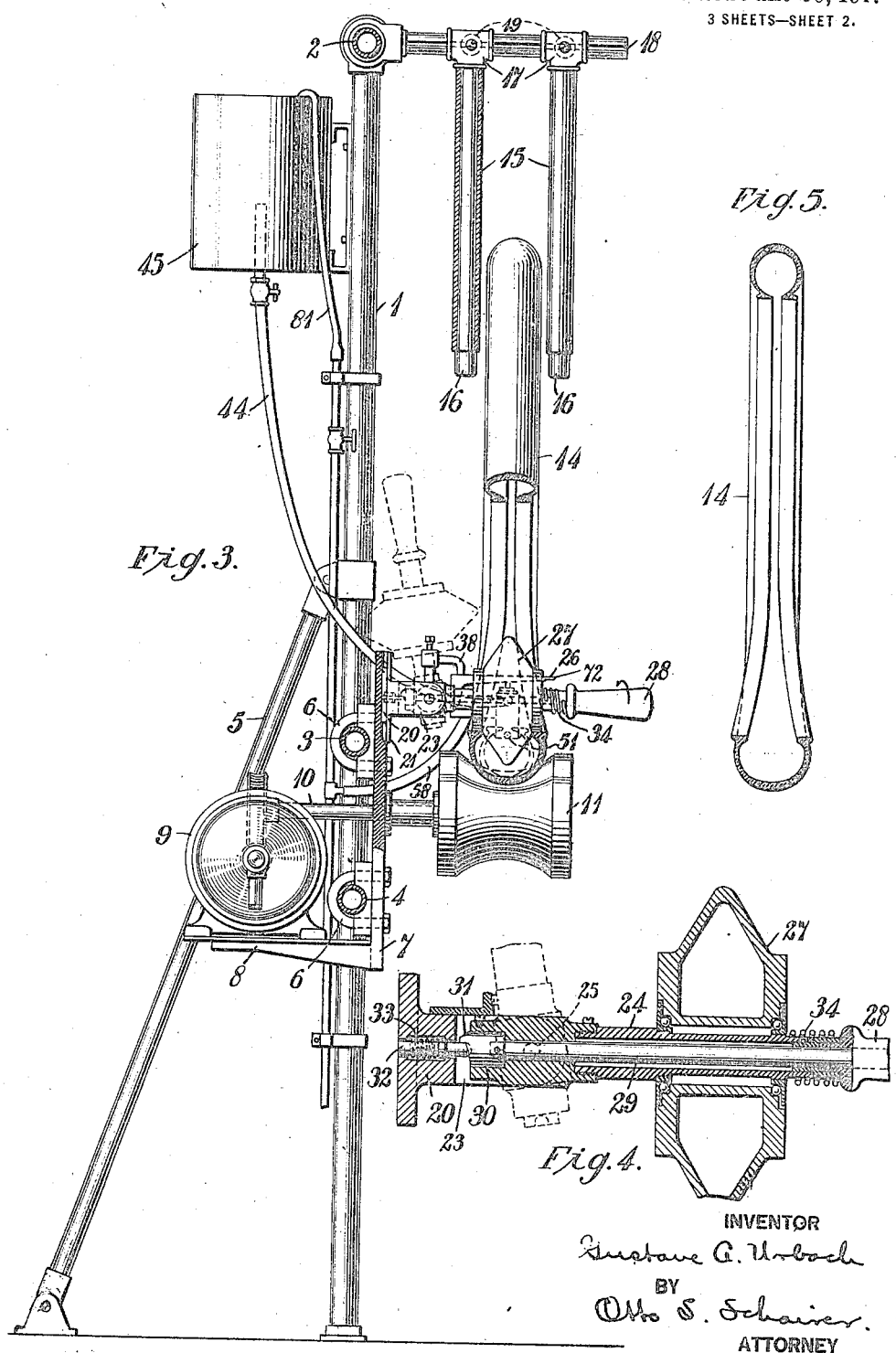

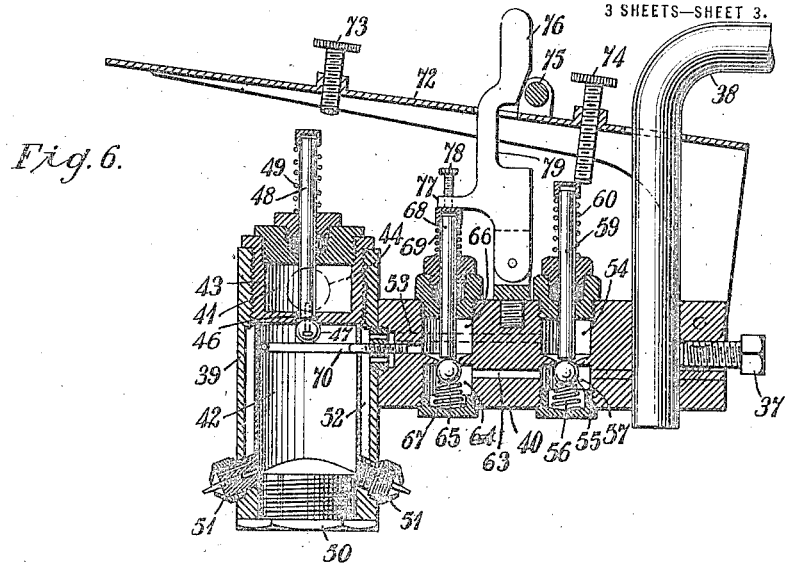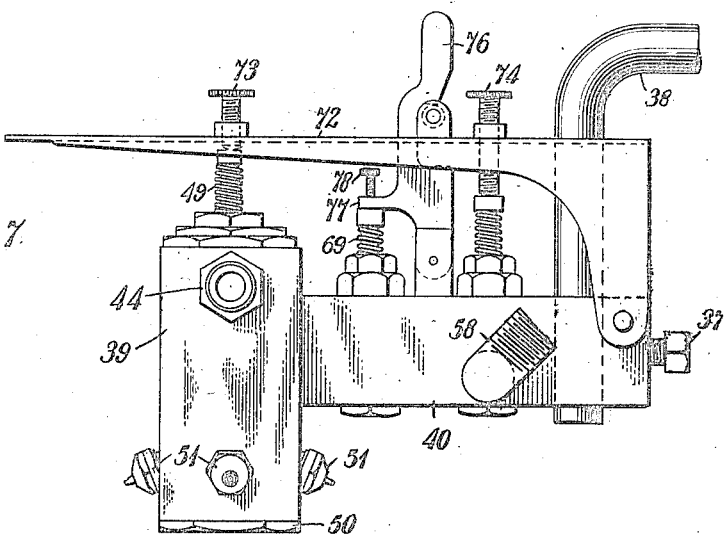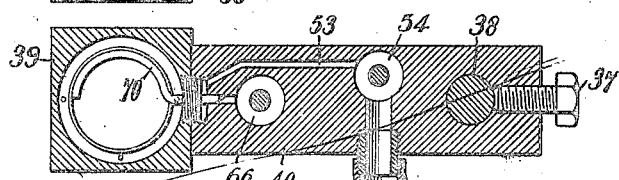

GUSTAVE A. URBACH, OF PITTSBURGH, PENNSYLVANIA.

SPRAYING-MACHINE.

1,231,222.

Specification of Letters Patent. Patented June 26, 1917.

Application filed December 22, 1915. Serial No. 68,222.

*To all whom it may concern:*

Be it known that I, GUSTAVE A. URBACH, a citizen of the United States, and a resident of Pittsburgh, in the county of Allegheny and State of Pennsylvania, have invented a new and useful Improvement in Spraying-Machines, of which the following is a specification.

My invention relates to liquid atomizing or spraying apparatus, and it has for its object to provide a machine whereby the interior surfaces of a pneumatic automobile tire casing may be effectively and expeditiously sprayed with a rubber solution or compound that is commonly employed as a lubricant for preventing the inner tube from adhering to the casing and that has heretofore been applied by means of a brush.

My invention is illustrated in the accompanying drawings, Figure 1 of which is a view in front elevation of a machine constructed in accordance therewith. Fig. 2 is a plan and sectional view along the line II—II of Fig. 1. Fig. 3 is a side and sectional view of the machine. Fig. 4 is a sectional view of the spreader roll and its mounting. Fig. 5 is a vertical sectional view through a tire casing showing the manner in which it is spread by the spreader roll. Fig. 6 is a vertical sectional view through the sprayer. Fig. 7 is a side view of the sprayer, and Fig. 8 is a horizontal sectional view through the sprayer.

The operating parts of the machine are carried by a frame or standard preferably composed of gas pipe and comprising two vertical posts 1, three horizontal cross pieces 2, 3 and 4, and inclined braces 5 that are attached at their upper ends to the posts, and at their lower ends to the floor. Secured to the front sides of the cross pieces 3 and 4 by means of clips 6 is a substantially L-shaped bracket 7 having a horizontal portion 8 that extends rearwardly and supports an electric motor 9, or any other suitable prime mover, for driving the machine. The motor is suitably geared to a shaft 10 that projects through, and is provided with a bearing in, the vertical portion of the bracket 7, the front end of the shaft carrying a roller 11 that is driven thereby and is grooved or provided with a concave surface. A second shaft 12 that extends parallel to the shaft 10 is also carried by the bracket 7 and a second roller 13, similar to the roller 11, is loosely mounted upon it and constitutes an idler.

The concave rollers 11 and 13 are adapted to receive and support a tire casing 14 in a position to have its inner surface sprayed, and the driven roller 11 causes the casing to rotate during the spraying operation. The tire casing is supported in a vertical position upon the rollers 11 and 13 by means of two vertical guide rollers 15, that engage opposite sides thereof and are carried by rods 16, the upper ends of which are attached to sleeves 17 that embrace a horizontal supporting rod 18 carried by the top cross member 2 of the standard. The sleeves 17 are adjustable upon the rod 18 to permit of receiving tire casings of different widths between the guide rollers 15, set screws 19 being provided for clamping them in the positions to which they have been adjusted.

The front face of the vertical portion of the bracket 7 is provided with a vertical groove that constitutes a guideway for a block 20, cleats 21 being provided for retaining the block in the guideway while a clamp 22 is employed for securing the block in any vertical position in which it is placed. The block 20 is provided with ears 23 between which one end of a hollow arm 24 is pivotally mounted. The pivotal mounting comprises a rod 25 that projects through, and is freely movable in, one of the ears 23 and is also fixed to the arm 24 so as to be rotatable therewith, the said rod being adapted to carry a sprayer 26 to be hereinafter described.

Mounted upon the free end of the hollow arm 24 is a spreader roll 27 having a substantially V-shaped face that is adapted to enter the opening in the inner circumference of the tire casing and to locally spread the sides apart for the reception of the sprayer. The arm is movable about its pivot by a handle 28 carried by the outer end of a rod or shaft 29 that extends through the arm and is provided at its inner end with a head 30. The end of the head is provided with a boss or rib 31 that extends transversely thereof at one side of its center and is adapted to engage the end of a pin 32 mounted in and projecting from the block 20, the pin being pressed forward by a spring 33. A helical spring 34 surrounds the outer end of the hollow arm 24 and has its ends respectively attached to the arm and the rod 29, the spring serving to normally maintain the parts in the relation shown in Fig. 4 with the rib or boss 31 above the pin 32. If the arm occupies its horizontal position, it is thus locked in that position. If the arm is moved from its vertical to its horizontal position, the pin 32 is pressed inwardly to permit of such movement and then assists in locking the arm. However, by turning the handle 28, the boss or rib 31 may be rotated to occupy a position below the end of the pin 32, thereby releasing the arm for upward movement. When the handle 28 is released, the spring 34 returns the parts to the position shown.

As before stated, the roll 27 is formed with a substantially V-shaped face and will therefore operate as a wedge to open out the tire. The inclined sides of the roll terminate in shoulders a which are adapted to bear upon the edges b of the tire and thereby exert a positive pressure on the tire to hold its outer periphery in driving engagement with the driven roll 11. The roll 27 is so constructed that a wedge shaped portion projects a distance outside of the shoulders less than the internal diameter of the tire, so that the outer periphery of the roll will be prevented from contacting with the internal painted surfaces by the shoulders a.

When the arm occupies its horizontal position, the sides of the tire casing are locally spread apart by the spreader roll 27, as shown in Figs. 2, 3 and 5. Sufficient pressure is also exerted upon the casing to cause it to be driven and rotated by the roller 11 either manually or the spring 33 operating through the pin 32. By adjusting the block 20 vertically in its guideway, the machine may be adapted to receive casings of any size from the smallest to the largest now regularly manufactured.

As before stated, the sprayer 26 is carried by the extended pivot rod 25. However, it is not mounted directly thereon, but is secured, by means of a set screw 37 (Fig. 6) to one leg of an L-shaped arm 38, the other leg of which is attached to the said pivot rod. The sprayer is substantially T-shaped and comprises a cross-head portion 39 and a body portion 40. The cross-head portion is divided internally into two chambers or reservoirs 41 and 42 by means of a hollow plug 43 that is inserted in its upper end. The upper reservoir 41 is connected by means of a pipe or hose 44 with a tank 45 carried by the upper part of the frame. An aperture 46 in the bottom of the plug provides communication between the upper and lower reservoirs that is controlled by a valve 47 having a stem 48 that projects out of the top of the plug, the valve and the stem being held in their uppermost positions by a spring 49.

The bottom of the hollow cross-head 39 is closed by means of a plug 50 that is removable to permit of cleaning the device when necessary. Communicating with the reservoir 42 immediately adjacent to the top of the plug 50 are three nozzles 51 that are arranged to direct the spray in three different directions in order to insure covering the entire internal surface of a tire casing. The nozzles are also connected by means of annular passage 52 with a passage 53 in the body portion 40 of the sprayer, which passage leads to a small chamber 54, an aperture in the bottom of which is closed by a ball valve 55 that is normally maintained against its seat by a spring 56, the said valve controlling communication between the chamber 54 and a lower chamber 57 that is connected, by means of a pipe 58, with a source of compressed air. The ball valve is operated by means of a stem or rod 59 that projects out of the top of the device and is normally held in its uppermost position by a spring 60.

The chamber 57 is also connected, by means of a passage 63, with another chamber 64 that contains a ball valve 65 controlling communication between the said chamber and an upper chamber 66. The ball valve is normally retained against its seat by a spring 67 and is actuated by a stem 68 that projects out of the top of the device and is held in its uppermost position by a spring 69. The chamber 66 is connected by means of a pipe 70 with the upper portion of the reservoir 42.

The valve stems 48 and 59 are actuated, to open the valves 46 and 55 and to thereby admit both the liquid or mixture to be sprayed and air pressure to the nozzle 51, by means of a lever 72 that carries screws 73 and 74 adapted to engage the tops of the valve stems. By adjustment of the screws 73 and 74, the valves may be caused to open to the proper degree and in the proper relation to each other, which is preferably simultaneous.

The lever 72 is also provided with a pin 75 that is adapted to engage and actuate a second lever 76 having a lateral projection 77 in which is threaded a screw 78 that engages the top of the valve stem 68, and also having a notch 79 for the reception of the said pin when the lever 72 is depressed as shown in Fig. 6.

The said parts are so arranged that, when the lever 72 is depressed, the pin 75 first engages the face of the lever 76 and causes the valve 65 to be opened to admit air pressure from the tube 58 via the chamber 57, passage 63 and chamber 64 to chamber 66 and tube 70 to the top of the reservoir or chamber 42, thereby forcing air through the central apertures of the nozzles and cleaning them thoroughly. Upon further depression of the lever 72 the pin 75 drops into the notch 79 and the valve 65 then closes. The valves 46 and 55 are then open and both liquid and air are admitted to the nozzles through the chambers 57 and 54, passage 53 and annular passage 52. The pin 75 coöperating with the notch 79 in the lever 76 holds the lever 72 in depressed position, during which time the spraying operation occurs. To stop the spraying operation, the lever 76 is moved to the left, thereby permitting the lever 72 to be raised by springs 49 and 60 and the valves 47 and 55 to be shifted to closed position and thereby cutting off the flow of liquid and air to the chamber 42 and the nozzle 51 respectively. Movement of the lever 76 to release the lever 72 again causes the valve 65 to be opened, with the result that the spraying operation is terminated by blowing out any liquid that remains in the reservoir 42 or in the nozzles. The sprayer is thus effectively cleaned both at the beginning and at the completion of the spraying operation, and freedom from clogging and great reliability of operation are thereby insured.

The liquid or mixture in the tank 45 is agitated to keep it thoroughly mixed and homogeneous by means of air pressure directed into it by a pipe or tube 81.

In the operation of the machine, tire casings are rolled or otherwise fed upon the rollers 11 and 13 and the arm 24 is then lowered until it becomes locked in its horizontal position. The spreader roll 27 then spreads the sides of the casing apart and causes sufficient pressure to be exerted so that the driven roller 11 rotates the casing. As the arm 24 is lowered, the cross-head of the sprayer 26 enters the casing where it is spread, and then by manipulation of the levers 72 and 76, as before explained, the spraying operation may be started and stopped. Upon completion of the spraying operation, the handle 29 is rotated to unlock the arm 24, as before explained, to permit of its being raised.

I claim as my invention:

1. A tire painting machine having in combination means for rotating the tire; means for progressively spreading the tire as it is rotated and means insertible between the separated edges for applying a liquid to the interior surfaces of the tire.

2. A tire painting machine having in combination means for rotating a tire, a roll having a V shaped periphery, a sprayer arranged in the rear of the roll and means for forcing the roll and sprayer in between the edges of the tire.

3. A tire spraying machine comprising means for rotating the tire, a spreader roll adapted to separate the sides of the tire, a mounting for the spreader roll that permits of its insertion into, and removal from, the tire, and means for spraying the interior of the tire.

4. A tire spraying machine comprising means for rotating the tire, a spreader roll adapted to separate the sides of the tire, a sprayer, and a mounting for the spreader roll and the sprayer that permits of their insertion into, and removal from, the tire.

5. A tire spraying machine comprising grooved rolls for supporting the tire, means for driving one of the rolls, adjustable guide rolls between which the tire revolves, a spreader roll, an arm carrying the spreader roll, an adjustable support to which the arm is pivoted, means for locking the arm when the spreader roll engages the tire, and a spraying device movable with the arm.

6. A spraying machine comprising a reservoir, a nozzle in communication with the reservoir, means for supplying fluid pressure to the nozzle, a valve for controlling the said supply, and means for admitting fluid pressure to the reservoir both when opening and closing the said valve.

7. A spraying machine comprising a reservoir, a nozzle in communication with the reservoir, means for separately supplying fluid pressure to the nozzle and to the reservoir, valves for controlling the said supplies, and means for operating the valves whereby the fluid under pressure is admitted to the reservoir both before the opening and upon the closing of the valve controlling the fluid supply to the nozzle.

8. A spraying machine comprising two reservoirs, one above the other, a valve controlling communication between the reservoirs, nozzles having discharge openings in communication with the lower reservoir, means for supplying compressed air to the lower reservoir, means for separately supplying compressed air to the nozzles, valves for controlling the supply of compressed air to said means, and means for operating all of said valves whereby air under pressure is supplied to the lower reservoir both upon the opening and closing of the valve controlling the air supply to the nozzles.

9. A spraying machine comprising a nozzle, having a passage for air and a passage for liquid, means including valves for supplying liquid and compressed air continuously to the respective passages and subsequently supplying compressed air to the liquid passage, whereby the latter may be freed from any obstruction.

10. A sprayer comprising a nozzle having passages for both a liquid and compressed air, means including valves for supplying liquid and air to the said passages, means for actuating said valves, means including a valve for admitting compressed air to the liquid passage, and means whereby the latter valve is temporarily opened prior to the opening of the aforesaid valves and is also temporarily opened subsequent to their closure.

11. A sprayer comprising a nozzle having passages for both a liquid and compressed air, means including valves for supplying liquid and air to the said passages, means for actuating said valves, means including a third valve for supplying compressed air to the said liquid passage, and means whereby the aforesaid valve actuating means actuates the said third valve when moved both to open and to close the aforesaid valves.

12. A sprayer comprising a nozzle having passages for both a liquid and compressed air, means including valves for supplying liquid and air to the said passages, a lever for actuating the said valves, means including a third valve for supplying compressed air to the said liquid passage, a lever for actuating the said third valve having means whereby it is actuated by the aforesaid lever and also whereby it retains the said lever in valve opening position until released.

13. In a machine of the character described, means for supporting and rotating a tire casing, a pivoted support arranged in proximity to said means, a coating device carried by the pivoted support and adapted to be moved into the tire casing, and a spreading element connected with the coating device and adapted to partly open the tire casing to permit of the entrance of the coating device thereinto.

14. In a machine of the character described, means for supporting and rotating a tire casing, a movable support arranged near said means, a coating device carried by the movable support and adapted to enter the tire casing, and an element to spread and partly open the tire casing prior to the entrance of the coating device thereinto.

In testimony whereof, I have hereunto subscribed my name this 18th day of Dec. 1915.

GUSTAVE A. URBACH.